United States Patent
Scherberger et al.

(10) Patent No.: US 8,620,701 B2
(45) Date of Patent: Dec. 31, 2013

(54) SYSTEM AND METHOD FOR RULES-BASED CAPITALIZATION

(75) Inventors: Gunter Scherberger, Denzlingen (DE); Michael Hohendorf, Waghausel (DE); Gerlach Torsten, Mannheim (DE)

(73) Assignee: SAP AG, Walldorf (DE)

( * ) Notice: Subject to any disclaimer, the term of this patent is extended or adjusted under 35 U.S.C. 154(b) by 2855 days.

(21) Appl. No.: 11/323,423

(22) Filed: Dec. 29, 2005

(65) Prior Publication Data
US 2007/0156477 A1    Jul. 5, 2007

(51) Int. Cl.
*G06Q 10/00*    (2012.01)
(52) U.S. Cl.
USPC ............................................. 705/7.11
(58) Field of Classification Search
USPC ..................................... 705/7, 7.11
See application file for complete search history.

(56) References Cited

U.S. PATENT DOCUMENTS

| | | | |
|---|---|---|---|
| 6,990,466 B1* | 1/2006 | Hu | 705/35 |
| 2002/0059117 A1* | 5/2002 | Yoch et al. | 705/27 |
| 2003/0158798 A1* | 8/2003 | Green | 705/30 |
| 2005/0267825 A1* | 12/2005 | Bernet et al. | 705/30 |

\* cited by examiner

*Primary Examiner* — Romain Jeanty
(74) *Attorney, Agent, or Firm* — Schwegman Lundberg & Woessner, P.A.

(57) ABSTRACT

In an embodiment, a computer-based system in a business organization is configured with a set of business rules. The computer-based system is further configured to receive an indication of a transaction within the business organization, and to automatically determine, based on the set of business rules, a location in a recording system of the business organization to record data regarding the transaction.

17 Claims, 3 Drawing Sheets

SYSTEM AND METHOD FOR RULES-BASED CAPITALIZATION

BACKGROUND

Business organizations must account for all aspects of their businesses including assets, inventory, costs, and other general ledger items. In business organizations today, these decisions are made by persons in the organization as the need arises. For example, when an automobile arrives at an automobile dealership, that automobile should be added to the dealership's inventory. In contrast, if that automobile is received by a taxi company, that automobile should be listed as a depreciable asset. While this is a relatively simple example, much more complex situations involving technical and complex accounting rules and practices exist. Moreover, if the person making this recording decision is not an accountant, or a person knowledgeable in the relevant business rules of the organization, there is a greater chance that the proper recording will not be generated. Indeed, even if highly skilled accountants are used to make such decisions, there will still be situations in which reasonable accountants may disagree regarding the proper accounting of an object in the business organization. The art is therefore in need of a different method and system to properly implement the business rules, and in particular the accounting rules, of business organizations.

SUMMARY

In an embodiment, a computer-based system in a business organization is configured with a set of business rules. The computer-based system is further configured to receive an indication of a transaction within the business organization, and to automatically determine, based on the set of business rules, a location in a recording system of the business organization to record data regarding the transaction.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
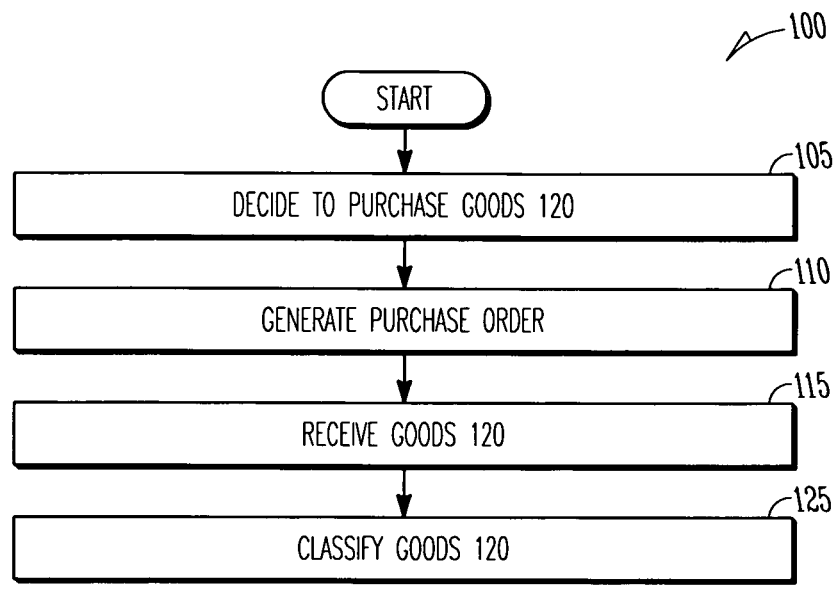
FIG. 1 illustrates an example embodiment of a business process.

FIG. 1 illustrates an example embodiment of a flow chart illustrating a general business process 100. In the process 100, a business organization decides to purchase goods at operation 105. A purchase order is generated at 110, and the goods are received at operation 115. The goods may be any physical object 120, such as an automobile, a computer, a photocopier, or office furniture. Upon receiving the object 120, the business organization should decide how to document and keep track of that object according to the business rules of the industry of which it is a part, any legal regulations pertaining to the industry, any best practices of the industry, and/or any standards of the business organization. For example, as illustrated in operation 125 in FIG. 1, the object may need to be classified into certain categories depending on the rules of the business organization and/or the industry. More particularly, if the object is a vehicle, and the business organization is a vehicle rental service, the business rules of the industry an/or particular business organization may require that the vehicle be tracked as to the type of vehicle, such as a sedan, van, light truck, heavy truck, limousine, or some other type of vehicle.

Figure 2:
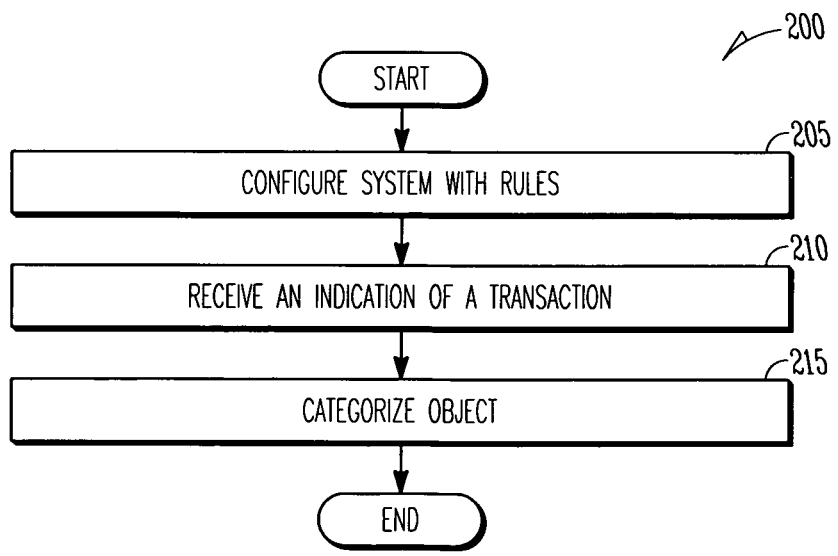
FIG. 2 illustrates another example embodiment of a business process.

FIG. 2 illustrates a flow chart of a process 200 to automatically determine the categories into which to place objects according to the business rules of the organization. First, a computer system is configured with the business rules of the particular company, the industry of which that company belongs to, or some other set of business rules at operation 205. After the configuration, the system receives at operation 210 some sort of indication that a transaction has occurred within the business organization. This indication may take on any form, and may include a paper document, an electronic document, a voice transmission, or a video transmission. Then, the system may determine at operation 215, based on the business rules that were used to configure the system, a location in a recording system of the business organization to record data regarding the transaction.

Figures 3, 4:
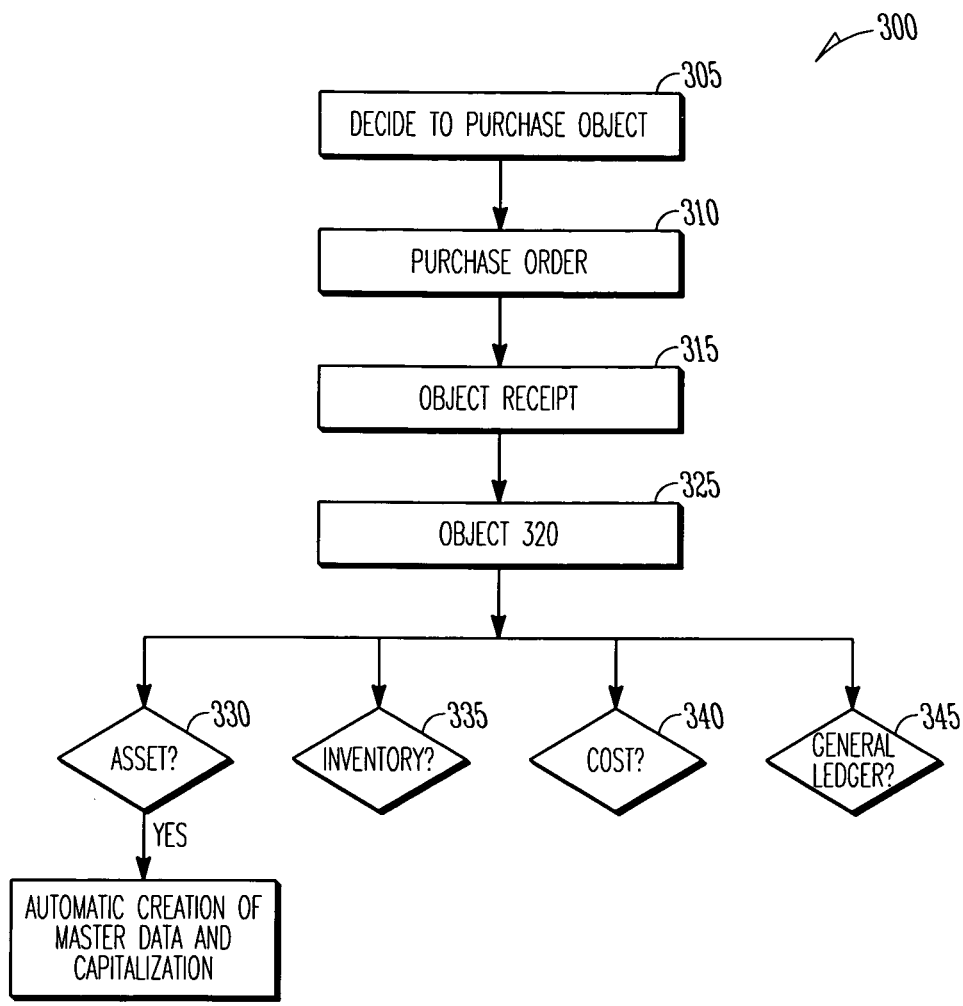
FIG. 3 illustrates an example embodiment of a business process relating to a ledger system.
FIG. 4 illustrates an example embodiment of a table that is used to determine the sequence in which sub-ledgers are invoked.

FIG. 3 illustrates a particular embodiment of the systems of FIGS. 1 and 2, and relates particularly to the automation of the proper accounting of an object that is purchased by a business organization. Specifically, FIG. 3 illustrates a business process 300 in which a decision is made to purchase an object at operation 305, a purchase order is generated at operation 310, and the object 320 is received at operation 315. The object 320 is then classified according to the accounting rules configured into the system at 325, and the accounting rules determine whether the object should be classified as an asset 330, an inventory item 335, a cost 340, or placed on a general ledger 345. In an embodiment, the classification places the object into a ledger and/or sub-ledger, wherein the ledger is a portion of a balance sheet. The accounting rules at 325 may include the general accounting rules and principles of a particular country, a particular industry, a particular company, or a division within a company. In an embodiment, one advantage of such a system is that the system is repeatable and more easily audited. That is, when a particular object 320 enters into a business organization, the automatic systems of FIGS. 1, 2, and 3 will always handle that object in the same manner—i.e., the element of human subjectivity has been removed. Indeed, the person in the business organization who first receives the object 320 in many cases will not even know how the system eventually accounts for the object (i.e., as an asset, cost, inventory, or general ledger item). It is this consistency that begets easier and repeatable audits.

In an embodiment, a rules-based activation decision is implemented via a table. FIG. 4 illustrates an example embodiment of such a table. In FIG. 4, a table 400 has a post field 410, a sequence field 420, and a sub-ledger field 430. For example, in FIG. 4, a document or other indication may come into the system indicating that a material A has been purchased by the business organization. The system may then read the table 400 to determine the manner in which material A should be accounted for. Specifically, table 400, and in particular the sequence field 420 of table 400, will determine the order that the sub-ledgers are checked to see if material A should be classified in one sub-ledger or another. Referring again to table 400, the sequence 450 indicates that the fixed asset (FXA) sub-ledger should be checked first to see if material A should be listed as a fixed asset. The fixed asset process will determine if material A should be listed as a fixed asset on the ledger. For example, if the business organization was a vehicle leasing business, and material A was an automobile, then the asset ledger process would place the object A on the asset sub-ledger. If the object A is not placed on the asset sub-ledger, then, as indicated by sequence 460 in the table 400, the inventory (INV) sub-ledger process is invoked. If the material A should be made part of inventory, such as is the case for an automobile in an automobile dealership, then the inventory sub-ledger process records the automobile as part of the inventory. If the material A is not made part of the organization's inventory, then as indicated by sequence 470 in the table 400, a cost sub-ledger process is invoked to determine if the material A should be listed as a cost. If the material A is not recorded as a cost, then, as indicated by sequence 480 in the table 400, a general ledger (GL) process is invoked to determine if the material A should be placed on a general sub-ledger. If the process fails to place the object A on the general sub-ledger, then in one embodiment, the system notes this as a failure and writes a message to a log file.

Figure 5:
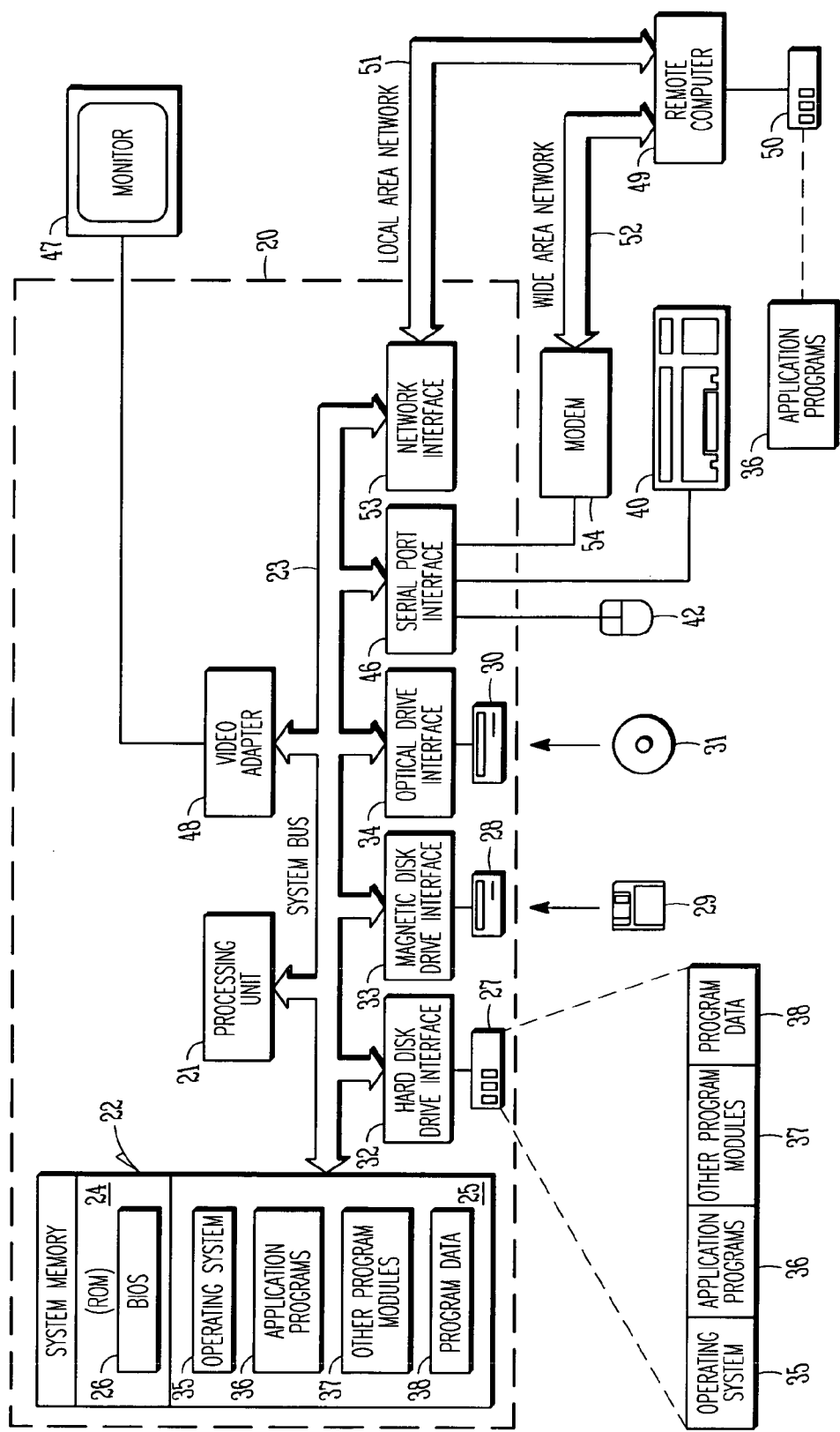
FIG. 5 illustrates an example embodiment of a computer system upon which embodiments of the present invention may be implemented.

FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A process comprising:
configuring a computer-based system for a business organization with a set of business rules;
receiving into a computer processor an indication of a transaction within the business organization;
automatically determining, using a computer processor, based on the set of business rules, a location in a recording system of the business organization to record data regarding the transaction; and
reading, using a computer processor, a table from a computer memory;
wherein the table comprises at least one entry relating to a document representing an object within a business organization; and
wherein the table further comprises a field that provides a sequence of segments of a ledger to check in order to determine a particular segment of the ledger into which to record the document.

2. The process of claim 1, wherein
the set of business rules comprises accounting rules;
the indication of a transaction comprises a document representing the transaction;
the transaction involves an object within the business organization;
the location in the recording system to record data relating to the transaction comprises the ledger in an accounting system; and
a party initiating the transaction has no role in the determination of where in the ledger the transaction is recorded.

3. The process of claim 2, further comprising:
configuring the computer-based system according to a particular set of accounting rules; and
configuring the computer-based system based on the set of business rules of a particular type of business organization.

4. The process of claim 3, further comprising configuring the computer-based system based on the particular set of business rules of a particular individual business organization.

5. The process of claim 2, wherein the ledger comprises an asset portion, an inventory portion, a cost portion, and a general ledger portion.

6. The process of claim 2, further comprising configuring the computer-based system to generate data for the portion of the ledger to which the object pertains.

7. A system comprising:
a computer processor programmed to configure a computer-based system for a business organization with a set of business rules;
a computer processor programmed to configure the computer-based system to receive an indication of a transaction within the business organization;
a computer processor programmed to configure the computer-based system to automatically determine, based on the set of business rules, a location in a recording system of the business organization to record data regarding the transaction; and
a computer processor programmed to configure the computer-based system to read a table from a computer memory;
wherein the table comprises at least one entry relating to a document representing an object within a business organization; and
wherein the table further comprises a field that provides a sequence of segments of a ledger to check in order to determine a particular segment of the ledger into which to record the document.

8. The system of claim 7, wherein
the set of business rules comprises accounting rules;
the indication of a transaction comprises a document representing the transaction;
the transaction involves an object within the business organization;
the location in the recording system to record data relating to the transaction comprises the ledger in an accounting system; and
a party initiating the transaction has no role in the determination of where in the ledger the transaction is recorded.

9. The system of claim 8, further comprising:
a computer processor programmed to configure the computer-based system according to a particular set of accounting rules; and
a computer processor programmed to configure the computer-based system based on the set of business rules of a particular type of business organization.

10. The system of claim 9, further comprising a computer processor programmed to configure the computer-based system based on the particular business rules of a particular individual business organization.

11. The system of claim 8, wherein the ledger comprises an asset portion, an inventory portion, a cost portion, and a general ledger portion.

12. The system of claim 8, further comprising a computer processor programmed to configure the computer-based system to generate data for the portion of the ledger to which the object pertains.

13. A non-transitory machine readable medium with instructions thereon to execute a process comprising:
   configuring a computer-based system for a business organization with a set of business rules;
   configuring the computer-based system to receive an indication of a transaction within the business organization;
   configuring the computer-based system to automatically determine, based on the set of business rules, a location in a recording system of the business organization to record data regarding the transaction;
   configuring the computer-based system to read a table from a computer memory;
   wherein the table comprises at least one entry relating to a document representing an object within a business organization; and
   wherein the table further comprises a field that provides a sequence of segments of a ledger to check in order to determine a particular segment of the ledger into which to record the document.

14. The non-transitory machine readable medium of claim 13, wherein
   the set of business rules comprises accounting rules;
   the indication of a transaction comprises a document representing the transaction;
   the transaction involves an object within the business organization;
   the location in the recording system to record data relating to the transaction comprises the ledger in an accounting system; and
   a party initiating the transaction has no role in the determination of where in the ledger the transaction is recorded.

15. The non-transitory machine readable medium of claim 14, further comprising:
   configuring the computer-based system according to a particular set of accounting rules; and
   configuring the computer-based system based on the set of business rules of a particular type of business organization.

16. The non-transitory machine readable medium of claim 15, further comprising configuring the computer-based system based on the particular set of business rules of a particular individual business organization.

17. The non-transitory machine readable medium of claim 14, wherein the ledger comprises an asset portion, an inventory portion, a cost portion, and a general ledger portion.

\* \* \* \* \*